(12) United States Patent
Dimech

(10) Patent No.: US 6,947,765 B1
(45) Date of Patent: Sep. 20, 2005

(54) METHOD FOR TRANSMITTING DATA BETWEEN DATA PROCESSING MEANS AND A RADIO COMMUNICATION NETWORK, MODULE AND MOBILE TERMINAL FOR IMPLEMENTING SAME

(75) Inventor: Jean-Marc Dimech, Chaumont en Vexin (FR)

(73) Assignee: Sagem S.A., Paris (FR)

( * ) Notice: Subject to any disclaimer, the term of this patent is extended or adjusted under 35 U.S.C. 154(b) by 0 days.

(21) Appl. No.: 09/380,944

(22) PCT Filed: Mar. 11, 1998

(86) PCT No.: PCT/FR98/00490

§ 371 (c)(1),
(2), (4) Date: Dec. 6, 1999

(87) PCT Pub. No.: WO98/40979

PCT Pub. Date: Mar. 11, 1998

(30) Foreign Application Priority Data

Mar. 12, 1997 (FR) .................................. 97 02929

(51) Int. Cl.⁷ ............................................. H04M 1/00
(52) U.S. Cl. .................... 455/557; 455/466; 455/66.1; 370/350; 375/356
(58) Field of Search ............................... 455/423–425, 455/501–503, 557, 344, 466, 66.1, 67.11–69, 455/554.2, 556.1, 560; 370/350; 375/355, 375/356, 362–368, 373–376

(56) References Cited

U.S. PATENT DOCUMENTS

| | | | |
|---|---|---|---|
| 4,129,755 A | | 12/1978 | Murakami |
| 4,231,114 A | * | 10/1980 | Dolikan ....................... 455/517 |
| 4,276,651 A | | 6/1981 | Bench et al. |
| 4,651,330 A | * | 3/1987 | Ballance ...................... 375/357 |
| 4,697,281 A | * | 9/1987 | O'Sullivan ................... 455/557 |
| 5,216,717 A | * | 6/1993 | Bourcet et al. ................ 381/3 |
| 5,408,520 A | * | 4/1995 | Clark et al. .............. 379/93.07 |
| 5,479,475 A | * | 12/1995 | Grob et al. .................. 455/557 |
| 5,517,521 A | | 5/1996 | Strawn |
| 5,799,091 A | * | 8/1998 | Lodenius ..................... 380/270 |
| 5,809,066 A | * | 9/1998 | Suomi et al. ................ 375/222 |
| 5,809,426 A | * | 9/1998 | Radojevic et al. .......... 455/502 |
| 5,898,685 A | * | 4/1999 | Schnizlein ................... 370/350 |
| 5,903,849 A | * | 5/1999 | Selin et al. .................. 455/557 |
| 5,923,705 A | * | 7/1999 | Willkie et al. .............. 375/220 |
| 6,081,571 A | * | 6/2000 | Jansson ....................... 375/376 |

(Continued)

FOREIGN PATENT DOCUMENTS

EP          0 318 685          7/1989

(Continued)

Primary Examiner—Charles Craver
(74) Attorney, Agent, or Firm—Greenberg Traurig LLP; Eugene C. Rzucidlo

(57) ABSTRACT

A data transmission module for transmitting data between a radio communication network that transmits data at a specified rate and data processing means includes network interface radio means for interfacing the data processing means with the radio communication network, data adapter means interposed between the network interface radio means and the data processing means through which data flows under the control of a sequencer means, wherein the sequencer means includes means for frequency-locking the sequencer means to the rate of the network. The data transmission process of the module includes the steps of locking the sequencer means to the rate of the network and synchronizing the flow of the data through the adapter means with the network.

1 Claim, 2 Drawing Sheets

U.S. PATENT DOCUMENTS 6,219,564 B1 * 4/2001 Grayson et al. ............ 455/574
6,243,372 B1 * 6/2001 Petch et al. ................. 370/350
6,577,860 B1 * 6/2003 Yoshida ...................... 455/423

FOREIGN PATENT DOCUMENTS

WO    WO 91 10305    11/1991

\* cited by examiner

METHOD FOR TRANSMITTING DATA BETWEEN DATA PROCESSING MEANS AND A RADIO COMMUNICATION NETWORK, MODULE AND MOBILE TERMINAL FOR IMPLEMENTING SAME

FIELD OF THE INVENTION

This invention is directed to a terminal that enables data communication between a data processing device such as a personal computer and a radio communication network, and to the data transmission process implemented therein.

BACKGROUND OF THE INVENTION

Radio communication networks have been developed over the last few years in order to transmit voice signals from or to mobile radio telephones. In order to guard against radio noise, the trend has evolved towards digital transmissions with coding of the voice. Hence, a network such as the GSM network, for example, also allows data to be transmitted with a portable handset. It is thus possible to send short data messages, and hence very limited traffic, in a common radio channel reserved in principle for signaling the setting up and severing of the communications of the various handsets.

It is furthermore possible to link a data processing apparatus, such as a PC, to the radio network. A data adapter is interposed at the output of the PC so as, for example in send mode, to present the data according to a format compatible with that provided for transmission over the network. There may moreover be provision to insert signaling data so as to manage the radio communication. The adapter therefore performs a change of format, or coding, of the data originating from the PC and carries out the reverse operation on reception. However, to avoid transmission errors, the problem arises of synchronization and adaptation between the radio network and the PC for which there is no direct link with the latter.

The problem would moreover be the same if the data processing application were incorporated into the handset or any other radio terminal, fixed or mobile.

The present invention aims to solve this problem.

SUMMARY OF THE INVENTION

To this end, the invention relates firstly to a process for transmitting data between a radio communication network, transmitting the data at a specified rate, and data processing means linked to the network by access means comprising network interface radio means linked to data adapter means interposed between the radio means and the data processing means so as to adapt them to the network, in which the data flow under the control of sequencer means, which process is one wherein the sequencer means are locked to the rate of the network so as to synchronize with the latter the flow of the data through the adapter means.

Thus, the flow of the data, through the adapter means, at the rate of the network allows error-free exchanges with the network since they are synchronized to this rate. The network rate can thus be conveyed over to the processing means through the adapter means. This is because the latter capture the data originating from the processing means at the network rate, thus providing the processing means with the sought-after information. In the case when data is received by these means, it is the rate of this reception which supplies this information.

The invention also relates to a data transmission module for implementing the process of the invention, comprising radio means for interfacing with a radio communication network transmitting the data at a specified rate, data adapter means arranged so as to be interposed between the radio means and data processing means and to adapt them to the network, in which the data flow under the control of sequencer means, wherein the sequencer means and the adapter means are grouped into a central unit comprising means for frequency-locking the sequencer means to the rate of the network.

As the adapter means are incorporated with the radio means, no problem of time shift or desynchronization arises between them since they can be connected together directly without any cable or transmission amplifier circuit. In addition, this incorporation makes it possible to use common means in time-sharing mode, thereby limiting the volume of hardware and its consumption.

The invention lastly relates to a mobile radio telephone terminal incorporating the module of the invention and more particularly to a mobile radio telephone terminal incorporating the module which may itself incorporate the processing circuits.

BRIEF DESCRIPTION OF THE DRAWINGS

The invention will be better understood with the aid of the following description of a preferred embodiment of a mobile radio telephone terminal for implementing the process of the invention, with reference to the appended drawing in which.

DETAILED DESCRIPTION OF THE INVENTION

Figure 1:
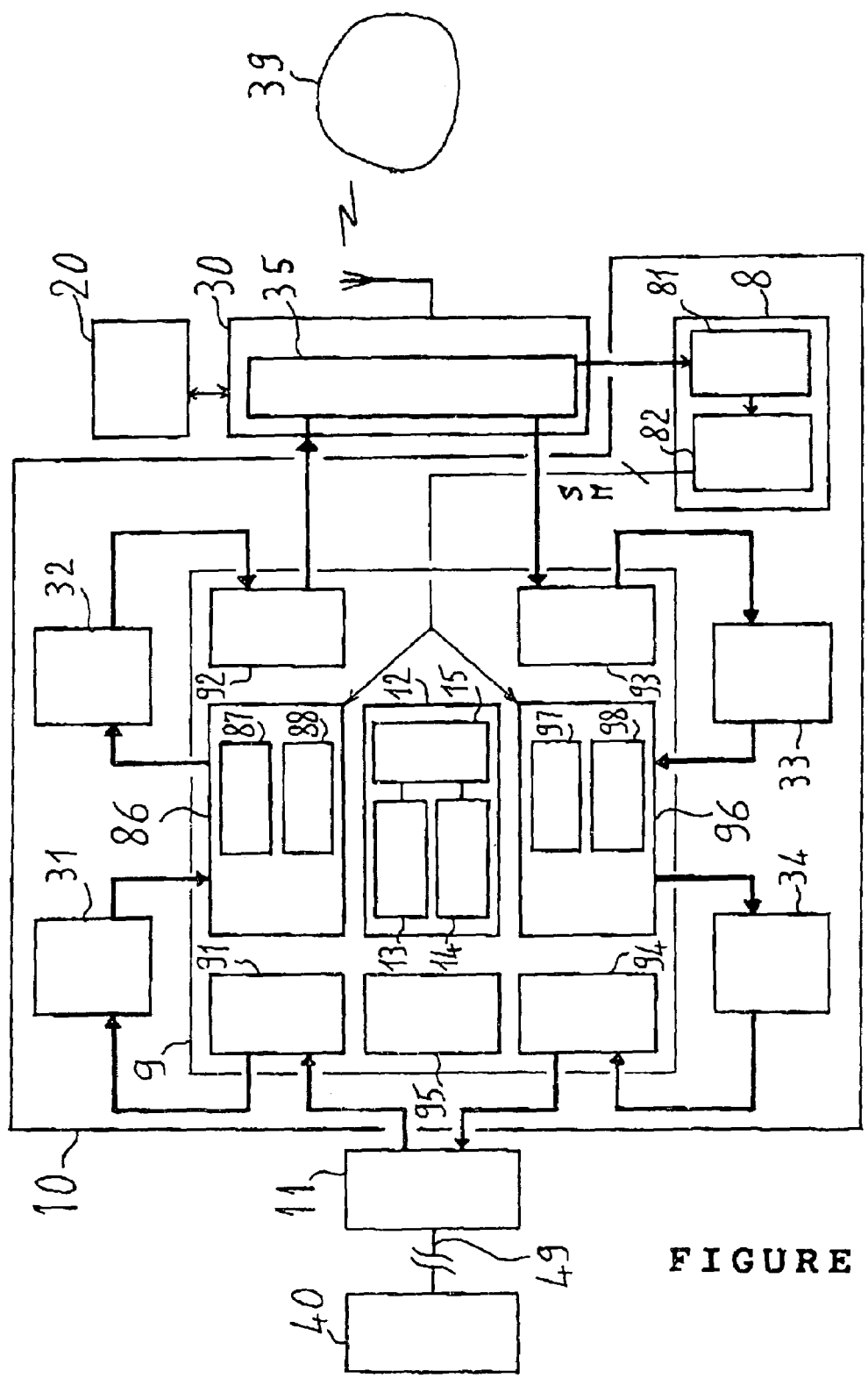
FIG. 1 is a block diagram of the terminal, linked to a PC.
Figure 2:
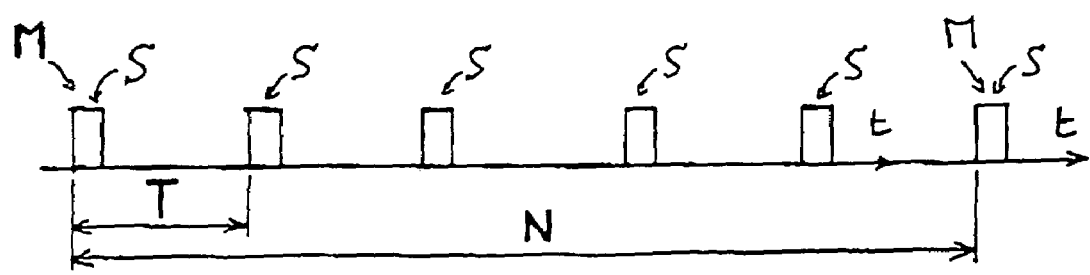
FIG. 2 is a timing diagram explaining the sequencing of the terminal, as a function of time t along the abscissa.

The terminal represented, here a mobile radio telephone handset 11, 10, 20, 30, comprises a central unit 10 connected, here bidirectionally, on the one hand, to a circuit 30 with modem 35 for send/receive radio interfacing with a radio communication network 39, here the GSM radio telephone network allowing the transmission of data, and, on the other hand, to a transmission local interface circuit 11, here of the V24 standard, connected to a PC 40 by a link 49, so as to offer this PC access to the GSM network 39.

As a reminder, the conventional dialing and voice communication circuits, comprising in particular a keypad, a microphone, a loudspeaker and their interface circuits, have been shown diagrammatically by the block 20 linked to the radio circuit 30. The central unit 10 manages the block 20, via links which are not represented.

The central unit 10 comprises a microprocessor 9, four buffer registers 31, 32, 33 and 34 and a time base 8, comprising an oscillator 81 followed by frequency dividers 82, controlling the microprocessor 9. The latter comprises four transit buffer registers 91, 92, 93 and 94, two data calculation and adaptation assemblies 86 and 96, a signaling processing assembly 12 with a circuit 13 for the conventional telephone signalings, in circuit mode, and a circuit 14 processing the signalings in packet mode, both linked to a circuit 15 managing the GSM signaling (level 3 of the ISO international standardization for open systems). The central unit 10, and more precisely here the microprocessor 9, furthermore comprises a data processing assembly 95 which is incorporated therein so as to manage an application, here data exchanged through the network 39 with servers of the INTERNET registered trademark.

A path for sending data to be sent over the network 39 leaves from the V24 interface circuit 11 and finishes at the radio circuit 30, passing through, in the order of propagation of the data, the transit register 91, the buffer register 31, the adaptation assembly 86, the buffer register 32 and lastly the transit register 92.

The adaptation assembly 86 comprises a telephone-type signaling data processing circuit 87 and a MINITEL-type signaling data circuit 88. The adaptation assembly 96, receiving the data originating from the network 39, likewise comprises circuits 97 and 98 which functionally are the counterparts of the respective circuits 87 and 88. Provision could however be made for separate integrated circuits for the assemblies 86, 95, 96, for example tailored circuits (ASICS) or a signal processor (DSP) controlled by the microprocessor 9, that is to say functionally forming a unit therewith.

It will be understood that the sole aim of this representation via functional blocks is clarity of exposition. In practice, the assemblies 12, 86, 95 and 96 are in fact tasks executed in time-sharing mode by common circuits of the microprocessor 9. It is appreciated that the various point-to-point links represented merely have the didactic aim of clear exposition of the data routing steps and that it is in fact a bus which connects the various circuits and is operated sequentially in time-sharing mode by the various tasks setting up these point-to-point links. The transit registers 91 to 94 are therefore physically a single register operated in time-sharing mode. The buffer registers 31 to 34 may likewise be merely a single physical register possibly incorporated into the microprocessor 9.

Incorporating the adaptation of the data into the GSM handset thus avoids the need for a microprocessor-based card linked to the handset in order to perform this adaptation. The total volume, and consumption, of the hardware thus remains limited especially since the single central unit 10, or microprocessor 9, itself, and hence in a centralized and multitask manner, manages the sequencing of its tasks (such as 86, 95, 96), without the need to link a microprocessor-based external adaptation card, and hence without any loss of time corresponding to the negotiations which would be required in like circumstances in the decentralized system which would then be produced.

In the reverse direction, a radio data reception path leaves the radio circuit 30, passes through the circuits 93, 33, 96, 34, 94 and finishes at the circuit 11.

The manner of operation of the GSM terminal with the PC 40 and the data processing assembly 95 will now be explained.

For transmitting data between the PC 40 and another data transmission apparatus connected to the GSM network 39, directly or through another network, the assembly 10 caters for the adaptation of the data exchanged between the two pieces of apparatus, so that these data can be transmitted through the GSM network 39.

In a first case, of setting up a data link in telephone or "circuit" mode to an apparatus connected to the GSM network 39, directly or through the analog STN network, a user instructs, from the PC 40, the sending of the telephone number of the called apparatus. The number sent over the link 49 is received by the circuit 13 via the circuits 11 and 91. To this end, the central unit 10 analyzes the signaling received from the PC 40 and steers it towards the circuit 13 or the circuit 14 depending on its nature: telephone, circuit mode, or of MINITEL type, packet mode. This number is transmitted to the circuit 15 which manages the setting up of the GSM communication, and in particular caters for the functions of the level 3 layer in the seven layers of the international ISO classification. Thus, the circuit 15 exchanges, via the modem 35, a sequence of signaling messages with the GSM network 39 and adapts this sequence on the basis of the signaling messages received from it in response to each message, so as to manage the setting up and severing of a communication, that is to say the physical tie carrying the application logical link between the two items of data processing apparatus. The circuit 15 also controls the modem 35 for connection to the network 39, in the sense that it can configure it according to specified parameters, such as for example its speed and its modulation frequency.

Once the communication has been set up, through the network 39, between the PC 40 and the called apparatus, the transmission of the data between them brings in the assemblies 86 and 96 so as to adapt the data to be exchanged. The circuits 87 and 97 cater in particular for the adaptation of the data between the V24 interface and the GSM network 39 as regards their format of presentation, respectively in send mode from the PC 40 to the radio circuit 30 and in receive mode, from the latter to the PC 40. Here, this involves the RA1' function of ETSI recommendation 04.21, relating to the assembly/disassembly of V110 frames of 36 or 60 useful bits. It is appreciated that other level 2 adaptation standards, such as ECMA 102, may be envisaged. The V24 interface transmits in asynchronous mode at 2.4, 4.8 or 9.6 kb/s, while, at the GSM network 39 end, the bits are exchanged at a specified synchronous bit rate of 3.6 or 6 or else 12 kb/s. The circuit 88 carries out the RA0 function of recommendation 04.21, that is to say the bit rate adaptation, between asynchronous data and synchronous data, to the nearest higher bit rate $2^n \times 600$ bits/s (n: positive integer), by padding or deleting "stop" bits, the circuit 98 performing the reverse operation.

In a second case, of setting up a call from the PC 40 to a MINITEL server, the communication setup principle is the same as above but brings in the circuits 14, 87 and 88.

Communications by calling the PC 40 from an apparatus connected to the radio network 39 may be set up likewise.

In this example, the assembly 10 serves as adaptation circuit (level 2) and as communication protocols management (level 3) for setting up the radio links transmitting the data through the GSM network 39. Stated otherwise, the GSM terminal, the network 39 and another similar GSM terminal linking the other data transmission apparatus are transparent in relation to the application, or processing, (level 7 software layers).

However, provision is made here for the assembly 10 to comprise, in addition to the adaptation and protocols for managing the radio links, functions relating to ISO layers above level 3, and in particular for it to process at least part of the application relating to the data transmitted.

Here, the assembly 95, which is substituted for the PC 40 and for the circuit 11, thus comprises the ISO layers of level higher than 3 for processing applications (level 7) with data transmitted over the INTERNET network, linked to the GSM network 39. The keypad of the assembly 20 and a display (which are not represented) are monitored by the microprocessor 9 under the control of man/machine inter-relation software. It is thus possible to display pages supplied by the servers and to navigate around the INTERNET network by calling the chosen server.

The detailed routing of the data in respect of the elementary steps through which they pass will be specified below, followed by their sequencing, by returning to the example of the radio link with the PC 40.

The bits sent by the PC 40 over the V24 link referenced 49 are received in the circuit 11 in the form of serial bytes flanked by START and STOP bits and stored temporarily in a UART circuit of the interface 11. When a complete byte has been received, the interface circuit 11 sends a transmit request to the microprocessor 9 and the latter frees itself along with the bus. The UART of the circuit 11 then sends, as input to the send path, the relevant byte over the bus and the transit register 91 stores it temporarily so as to retransmit it to the buffer register 31, which serves as input buffer for data blocks which will be processed by the assembly 86. When a data block, of sufficient size for a V110 frame, has been stored in the register 31, the microprocessor 9, which manages the writing, or reloading thereof and the reading, or emptying thereof, can detect that the sufficient fill threshold has been reached. The microprocessor 9 then transfers the data block from the register 31 into a work register, not represented, of the assembly 86. Software then instructs the microprocessor 9 to execute the data adaptation task indicated above and thus to supply a V110 frame which is stored temporarily in a local output work register, not represented. Thereafter, the latter is emptied into the buffer register 32 so as to free, for other tasks, the work registers of the microprocessor 9. The content of the buffer register 32 is subsequently transmitted to the GSM radio modem 35 by a two-step transfer task, passing via the transit buffer register 92, according to the procedure already explained in respect of the register 91.

The principle of the transmission, over the receive path, of the radio data received, from the radio interface 30 to the V24 interface circuit 11, is similar to that just set forth in respect of the send path and it will therefore not be described further, apart from the fact that the assembly 96 performs the reverse conversion to that of the assembly 86, so as to provide V24 data which is in particular devoid of padding bits.

The synchronizing of the various steps above will now be discussed.

The oscillator 81 of the time base 8 oscillates around a specified frequency as a function of the rate of transmission of the data around the GSM network 39. This specified frequency is not necessarily equal to this rate, but it exhibits a constant, integer or fractional ratio therewith. In this example, so as to guard against the possible drifting of the oscillator, the latter is connected at input to the radio interface 30 so as to receive the rate of the GSM network 39 from the modem 35 and lock on. The rate of the network 39 is in practice defined from the frequency of the radio carrier which locks the oscillator 81 to this frequency. The frequency dividers 82 regularly supply the microprocessor 9 with cyclic pulses at a lower rate, here trios of pulses S distributed over a period T of 60 ms, each respective pulse S being followed by a period of 4/13, 4/13 and 5/13 of the 60 ms. Furthermore, the dividers 82 supply, on another output, a low-frequency so-called pattern pulse M whenever, here, five of the above pulses S have been generated, that is to say about every N=100 ms.

The time base 8 furthermore supplies clock signals at high frequency (MHz) which control the rate of the microprocessor 9 and in particular the adaptation assemblies 86 and 96.

The pulses S are commands for synchronizing the buffer registers 32 and 33 with the GSM network 39. With each receipt of a pulse S, the microprocessor 9 transfers data of a V110 block from the register 32 to the modem 35, via the transit register 92. The modem 35 comprises, in a manner which is conventional for the GSM network, a buffer register, not represented, making it possible to store two blocks of data which will be interleaved with the addition of redundancy during their radio transmission, which buffer register therefore makes it possible to ensure regular transmission of bit packets between the successive receptions of the data blocks originating from the register 32.

Likewise, here by interleaved time-sharing of the bus, the radio data received by the modem 35 are transferred to the buffer register 33. This synchronization by the pulses S thus avoids any risk of transmission error between the radio interface 30 and the assembly 10. The buffer registers 31 to 34 which, functionally, are in fact a part of the adapter means (86, 96), have a sufficient size to contain several data blocks so as to tolerate fluctuations in the waiting time for the availability of the adaptation assemblies 86 and 96 (availability of the multitask microprocessor 9 to perform the tasks symbolized by the assemblies 86 and 96). However, the V24 data throughput must, on average, be adapted to the V110 data throughput, and hence to the rate of the GSM network 39, manifested by the pulses S and M. It has been found that the pulses M, with period N five times smaller than the average period of the pulses S, defined a period N corresponding to a transmission of an integer number of bytes, independently of the choice of speed from among those provided for on the GSM network 39, thus making it possible to process the data in the form of bytes. Therefore, here it is preferred to synchronize the overall operating cycle of all the send 11, 91, 31, 86, 32, 92, 30 and receive 30, 93, 33, 96, 34, 94, 11 channels or paths to the pattern pulses M, and also together with, in this overall cycle, shorter cycles for, for example, the data transfers, according to the periodicity of the pulses S.

Between two pattern pulses M, a pattern of five data blocks to be sent is processed in the assembly 86, and likewise on reception in the assembly 96 so as in particular to check the integrity of the data bytes received from the network 39. Five pulses S thus instruct, in send and receive mode, five successive transfers of blocks forming in total a pattern. In send mode, the data are thus transmitted successively from the V24 interface circuit 11 to the buffer register 31 where they are stored temporarily, and thereafter extracted in synchronism with the network 39 by the pulses S so as to be adapted thereafter by the V110 coding, the latter being adapted to their long-distance transmission, in the assembly 86, and transmitted to the radio circuit 30 via the send-mode output buffer register 32. In receive mode, the data in the V110 format are transferred successively from the radio circuit 30 to the buffer register 33 where they are stored temporarily, and thereafter extracted by the pulses S in synchronism with the network 39 so as to be adapted (96) by a decoding of the V110 format and transmitted to the receive-mode output buffer register 34 and then to the circuit 11 and to the PC 40, which adapts the format and the bit rate at the PC 40 end.

The byte-by-byte transfers over the bus may be distributed within the period N of the pulses M, that is to say possibly discontinuous transfers, insofar as the scheduled mean throughput of data has flowed over this period N.

Likewise, the adaptation circuits 86 and 96 must perform this adaptation of a pattern in this same period N of the pulses M. In short, this is real-time operation.

It is appreciated that the invention can be implemented through the construction of an assembly, or module, having the functionalities of this detailed example, mobility or portability being merely a subsidiary characteristic.

What is claimed is:

1. A process for transmitting data between a radio communication network that transmits data at a specified rate and data processing means comprising a personal computer linked to the network by terminal means, wherein the terminal means includes data adapter means through which the data flows under the control of sequencer means, said process comprising the steps of locking the sequencer means to the rate of the network and synchronizing the flow of the data through the adapter means with the network, by filling a first buffer register with data to be sent, said data originating from the processing means, generating extraction pulses by the sequencer means, said extraction pulses synchronized with the rate of the network, extracting with the extracting pulses the data from the first buffer register, encoding said data by the data adaptor mean and transmitting said data to a network interface radio means, storing data originating from the radio communication network in a second buffer register, extracting with the extracting pulse the data from the second buffer register, decoding said data and transmitting said data to the processing means.

* * * * *